(12) United States Patent
Lewis (10) Patent No.: US 9,739,609 B1
(45) Date of Patent: Aug. 22, 2017

(54) TIME-OF-FLIGHT SENSOR WITH CONFIGURABLE PHASE DELAY

(71) Applicant: Amazon Technologies, Inc., Seattle, WA (US)

(72) Inventor: Isabella Talley Lewis, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 550 days.

(21) Appl. No.: 14/225,260

(22) Filed: Mar. 25, 2014

(51) Int. Cl.
*G01C 3/08* (2006.01)

(52) U.S. Cl.
CPC ....................................... *G01C 3/08* (2013.01)

(58) Field of Classification Search
CPC . G01C 3/08; G01S 17/10; G01S 7/484; G01S 7/4865; G01S 7/497
See application file for complete search history.

(56) References Cited

U.S. PATENT DOCUMENTS

| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 2009/0108184 | A1* | 4/2009 | Iwasawa ............... G01S 7/4802 250/216 |
| 2012/0223885 | A1 | 9/2012 | Perez |
| 2013/0278917 | A1* | 10/2013 | Korekado ............... G01C 3/08 356/5.01 |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Luke Ratcliffe
(74) *Attorney, Agent, or Firm* — Lee & Hayes, PLLC (57) ABSTRACT

Techniques to determine a distance associated with a surface using time-of-flight (ToF) of pulses of light occurring at a predetermined frequency. A ToF camera may include a light emitter that emits light according to one or more phase delays relative to the configured of a first storage device of multiple storage devices of the ToF camera to receive light, convert to current, and store a charge corresponding to current. For instance, a light emitter may emit pulses at a 0° phase delay (i.e., simultaneously with the opening of the first storage device), a 90° phase delay, a 180° phase delay, and a 270° phase delay. Light captured and stored as energy in the storage devices may be then be analyzed to estimate a distance to a surface of an object in an environment. After estimating a distance between the ToF camera and a surface, the ToF camera may optimize its phase delay to reduce the error associated with a subsequent distance measurement.

20 Claims, 8 Drawing Sheets

TIME-OF-FLIGHT SENSOR WITH CONFIGURABLE PHASE DELAY

BACKGROUND

A time-of-flight (ToF) sensor can measure a distance to an object by emitting light and measuring a ToF of light that is reflected off of the object and back to the sensor. Traditional ToF cameras include two sensors, exactly one of which is open at any given time, and a clock for synchronizing the operation of the sensors and the light emitter. Synchronization of the sensors nominally transfers charge between each sensor at twice the frequency that the light source modulation. Traditional ToF cameras emit the light in pulses and according to one or more fixed phase delays (that is, an amount of time after a first of the two sensors is configured to store a charge corresponding to current based on received light). However, these fixed phase delays might not be optimized at all distances for reducing error caused by noise from the sensor and/or the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems and techniques to determine a distance associated with a surface using time-of-flight (ToF) of a plurality of pulses of light occurring at a predetermined frequency. As described above, a ToF camera may include a light emitter that emits light according to one or more phase delays relative to the opening of a first sensor of multiple sensors of the ToF camera. These multiple charge sensors could be 2 charge reservoirs, hereafter referred to as sensor A and sensor B, which might be operated to attract the incident charge over half the ToF basic light modulation period. For instance, a light emitter may emit pulses at a 0° phase delay (i.e., simultaneously with the opening of the first sensor), a 90° phase delay, a 180° phase delay, and a 270° phase delay. Light captured and stored as energy in the sensors may be then be analyzed to estimate a distance to a surface of an object in an environment. For instance, a calculation of the relative time delay from these signals would be arctangent((AB1−AB3)/(AB2−AB4)) where AB is the difference between the signal captured on sensor B and sensor A segments and reading 1, 2, 3, and 4 are 0, 90, 180, and 270 degrees relative phase delays from the AB clocking reference.

In some instances, however, noise in the sensor, in the environment, or both may result in an error in the estimate distance calculation. For instance, there will be sensor readout noise and shot noise associated with each collected reading in the charge sensors. Since the total light received in the A and B sensor partitions and the read noise of the sensor for each channel will be the same for each data set of 0, 90, 180, and 270 degree readings, the noise in the arctan equation will be the same in both the numerator and the denominator, regardless of the relative return timing. Meanwhile, the noise in the calculation of the arctan phase will be different depending on the relative return timing. For instance, consider a return signal phasing such that the signal in the A sensor is 50%, 100%, 50%, and 0% and the B sensor is 50%, 0%, 50%, and 100%. The calculated phase is arctan((0−0)+noise)/(0−100+noise)). Meanwhile, a second return phasing possible if the full delay cycle is delayed by 90 phase degrees would return sensor A and B signals of 100%, 50%, 0%, 50% and 0%, 50%, 100%, 50% respectively, for a calculated phase of arctan ((100−0+noise)/(0−0+noise)). The noise in the calculated arctan calculation is 40% is the first case, illustrating that a control of the phasing at the output for all 4 delay signals can be beneficial for distance calculation.

Therefore, the techniques and systems below describe ToF cameras have configurable phase delays for the purpose of reducing error in distance calculations made by these cameras. To do so, an optimized phase delay may be determined for each of multiple distances. That is, for a particular distance, multiple phase delays (e.g., between 0° and 90°) may be utilized and an error may be calculated for each phase delay. The phase delay yielding the lowest error may then be selected as the optimal phase delay for use at that distance. This process may be repeated at intervals throughout the maximum distance measureable by the ToF camera. Thereafter, a mapping may be created that maps these distances (or distance ranges) to one or more corresponding phase delays. Alternatively, a function may be extrapolated based on these data points.

Regardless of whether a mapping (e.g., a table of distances to phase delays) or a function is utilized, the mapping or function may later be used when estimating distances using a ToF camera. For instance, a ToF camera may identify (e.g., from a depth map) an object of interest from an environment and may estimate a distance between the ToF camera and the object. Thereafter, the sensor may use the predefined mapping or function to determine an optimum phase delay for the estimated distance. For example, envision that the camera has been utilizing the following four phase delays when first estimating the distance: 0°, 90°, 180°, and 270°. In addition, envision that for the particular estimated distance the mapping or function may indicate the following four phase delays result in the lowest amount of error when making a subsequent distance estimation: 10.2°, 100.2°, 190.2°, and 280.2°. As such, the ToF camera may adjust its phase delay by 10.2° and may again estimate the distance to the object. The ToF camera may then again map this distance to an optimized phase delay and may repeat again adjust the phase delay prior to making yet another distance estimation. Note that noise reductions can be achieved with a relatively small set of phase delays. For instance, having delays of 0, 30, 60, and 90 can achieve no more than 10% noise above the best phase noise compared to 40% at the worst case phasing.

The systems and techniques described herein may be implemented in a number of ways. Example implementations are provided below with reference to the following figures.

Figure 1:
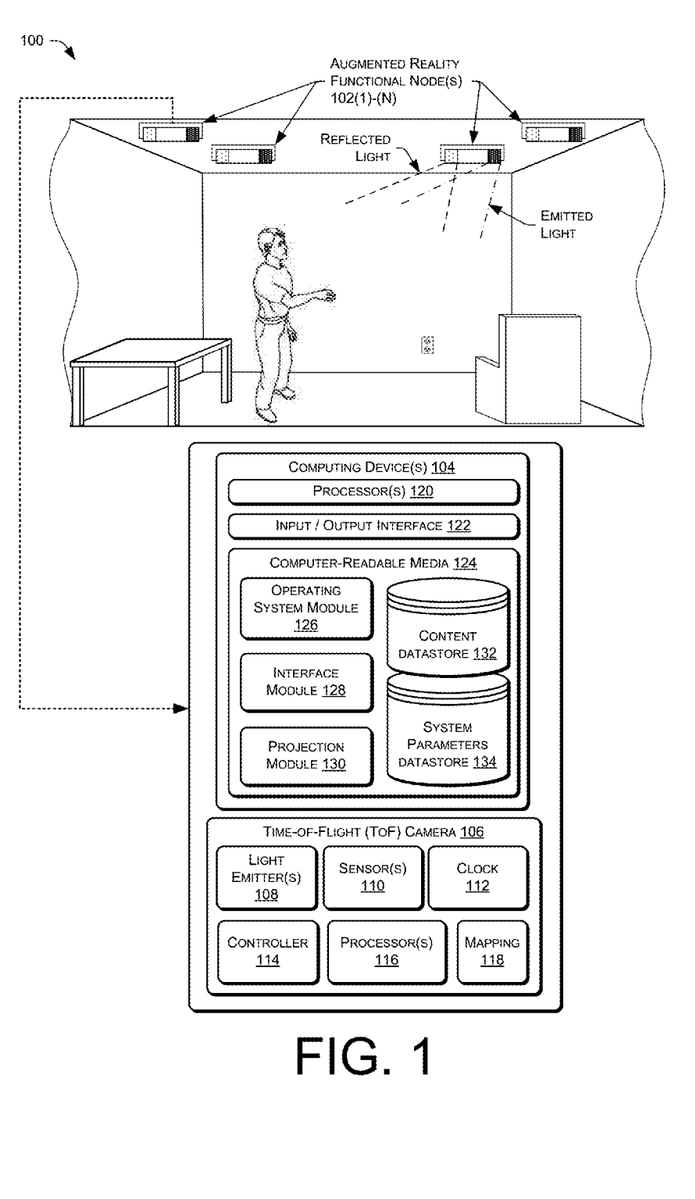
FIG. 1 illustrates an environment that includes an augmented reality functional node (ARFN) and a user that may interact with the ARFN.

FIG. 1 shows an example augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices.

As illustrated, each ARFN 102 may include one or more computing devices 104, as well as one or more time-of-flight (ToF) cameras 106 for estimating distances to objects within the environment 100. As illustrated, the ToF camera 106 may include one or more light emitters 108, sensors 110, a clock 112, a controller 114, and one or more processors 116. When active, the light emitter 108 may emit light onto any surface within the environment 100. The sensors 110, meanwhile, may receive light that is reflected off of these surfaces, with this reflected light being converted into a current that charges a capacitor. The controller 114, meanwhile, may operate one or more switches that route the current to one of the sensors with reference to the clock 112. That is, a first of the sensors (e.g., a memory or storage element of one of the sensors) may be switched to receive current corresponding to received light while a switch to the second memory element of the second sensor is not configured to route the current to the second sensor, and vice versa. As such, current corresponding to the reflected light at any given time may either be received at the first sensor or the second sensor (although other implementations may utilize more than two sensors). Thereafter, a difference of energy stored in the first and second sensors may be determined for two phase delays (e.g., 0 and 90 degrees), a ratio may be determined there from and, from this ratio, the processors 116 may determine or estimate a distance to the object that reflected the light.

As discussed in further detail below, the sensors 110 may include a photodetector, at least two storage elements, and switches or other functionality for routing current to the storage elements. The photodetector receives the reflected light and converts the light into an electrical current. The sensors may then switch between routing the current to the first storage element and routing the current to the second storage element. Both storage elements store charges based on the amount of current received, which these charged being used to calculate a distance that the reflected light traveled. The photodetector may comprise a photodiode, active-pixel sensors (APSs), charge-coupled devices (CCDs), or the like.

Furthermore, the ToF camera 106 may store (e.g., in memory) a mapping 118 that maps distances to phase delays for use by the camera 106. That is, the ToF camera 106 may have previously been configured to indicate, for each respective distance from zero to a maximum distance measurable by the camera, the optimized phase delay. A phase delay may reference an amount of delay between when a first of the sensors 110 is configured to receive current corresponding to received light and emission of a first pulse of light by the emitter 108. In some instances, the mapping 118 may indicate an ideal phase delay for use by the ToF camera 106 for each of multiple ranges of distances. For instance, the mapping 118 may indicate that the ToF camera should implement a 5° phase delay for distances between 0 and 0.12 m, a 10° phase delay for distances between 0.12 m and 0.2 m, and so forth. Therefore, after identifying an object of interest (e.g., a hand of a user within the environment) and calculating an initial distance estimation, the processors 116 may map this distance to an optimized phase delay using the mapping 118. The ToF camera may then implement this phase delay for a subsequent measurement. Further, this process may repeat each time a new distance is estimated.

In order to create this mapping 118, the ToF camera 106 (or a camera with the same or similar specifications) may be operated, at each of multiple distances, using multiple different phase delays. The error associated with each of these phase delays for that distance may then be analyzed and the phase delay associated with the measurement having the lowest error may be designated as the optimized phase delay for that distance (or range of distances). Furthermore, while FIG. 1 illustrates the mapping 118, in other instances the ToF camera may implement a function that has been extrapolated from the measurement data. The processor 116 may utilize this function, using the estimated distance as a variable, when determining a phase delay to implement.

In addition to the ToF camera 106, the ARFN 102 may implement other sensors, such as one or more other cameras, one or more projectors, or the like. In some instances, the ARFN 102 includes a projector for projecting content within the environment in response to receiving a request from a user within the environment. For instance, a user within the environment may request that the ARFN 102 project a particular electronic book that the user wishes to read. In response, the ARFN 102 may project the book onto a projection surface within the environment. In another example, the user may request that the ARFN 102 project a particular movie or show that the user wishes to watch. In response, the ARFN 102 may obtain the content (locally or remotely) and may project the content onto a surface in the environment. In yet another example, the ARFN 102 may be configured to project a user interface (UI), such as a keyboard, a slider bar, a virtual remote control to operate a television within the environment 100, or any other type of UI.

As illustrated, the computing device 104 of the example ARFN 102 includes one or more processors 120, an input/output interface 122, and computer-readable media 124. The processors 120 may be configured to execute instructions, which may be stored in the computer-readable media 124 or in other computer-readable media accessible to the processors 120. Furthermore, while FIG. 1 represents both processors 116 and 120, in some instances these processors are the same.

Figure 2:
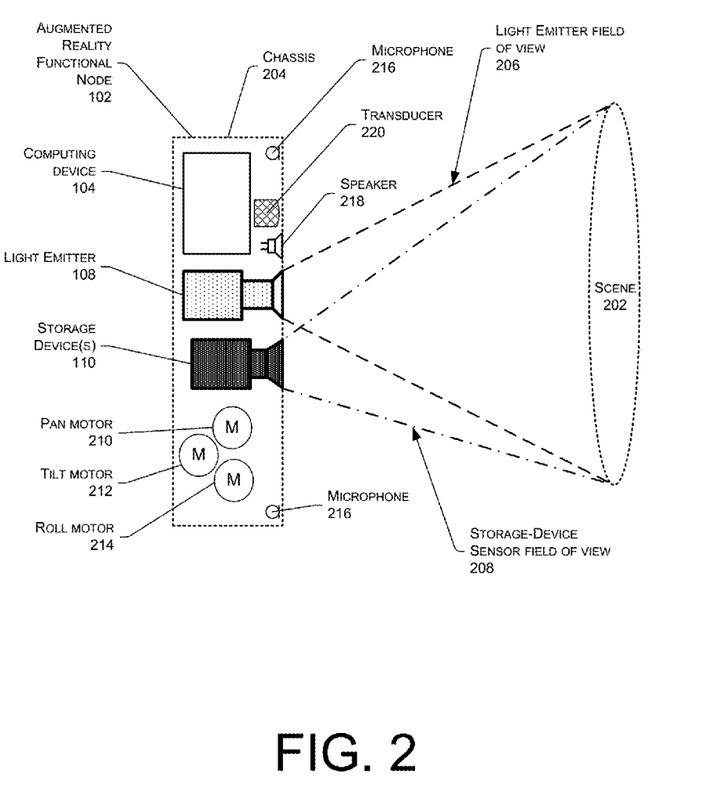
FIG. 2 illustrates an example ARFN that includes a computing device, a time-of-flight (ToF) camera, and other selected components for allowing a user to interact with the ARFN.

The input/output interface 122, meanwhile, may be configured to couple the computing device 104 to other components of the ARFN 102, such as microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. Therefore, it is to be appreciated that the illustration of the ARFN 102 of both FIGS. 1 and 2 is for example purposes only, and that components of the ARFN 102 may be configured in any other combination and at any other location.

The computer-readable media 124, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 124 may reside within a housing of the ARFN, on one or more storage devices accessible on a local network, on cloud storage accessible via a wide area network, or in any other accessible location.

The computer-readable media 124 may store several modules, such as instructions, datastores, and so forth that are configured to execute on the processors 120. For instance, the computer-readable media 124 may store an operating system module 126, an interface module 128, a projection module 128, a content datastore 132, and a system parameters datastore 134.

The operating system module 126 may be configured to manage hardware and services within and coupled to the computing device 104 for the benefit of other modules. The interface module 128, meanwhile, may be configured to receive and interpret commands received from users within the environment 100. For instance, the interface module 128 may analyze and parse data captured by the ToF camera 106 or other cameras to identify hand gestures made by users within the environment 100. In response to identifying a predefined gesture, the interface module 128 may interpret the gesture and cause the ARFN 102 to perform a corresponding action.

For instance, if a user within the environment 100 makes a gesture requesting that the ARFN 102 project a certain piece of content, then the interface module 128 may interpret the gesture and cause the projection module 130 to project the content via a projector.

The content datastore 132, meanwhile, stores content for outputting within the environment. For instance, the content datastore may store applications and data for use within the environment 100. The projection module 130 may access the content datastore 132 in order to project requested content within the environment 100. For instance, when the user requests that the ARFN 102 project a particular electronic book, the projection module 130 may access the content datastore 132 to retrieve and cause projection of the desired electronic book.

The computer-readable media 118 may store the system parameters datastore 134, which is configured to maintain information about the state of the computing device 104, the ToF camera 106, and so forth. For example, and as described in detail below, the ARFN 102 may be configured to pan and tilt for the purpose of allowing the light emitter 108 and the light sensor 110 to access different projection surfaces in the environment 100. As such, the system parameters maintained in the datastore 128 may include current pan and tilt settings of the camera and projector, an indication of content that the ARFN 102 is currently projecting or otherwise outputting, and the like.

The system parameter datastore 128 (or another datastore) may further store a library of reference gestures that may be used to interpret user gestures. As illustrated, the user in the room may make gestures with his body, such as hand motions, that can be captured by the cameras. The computing device identifies motion parameters corresponding to the observed gesture. The motion parameters are compared to those of the gesture library. The device then classifies the observed gesture based on the comparison.

FIG. 2 shows additional details of an example ARFN 102 that may be configured to measure distances of surfaces, identify movement of the surfaces (or objects), project a user interface (UI), and/or to identify and respond to user gestures, as described above with reference to FIG. 1. The ARFN 102 is configured to scan at least a portion of a scene 202 and the objects therein. The ARFN 102 may also be configured to provide output, such as images, sounds, and so forth.

A chassis 204 holds the components of the ARFN 102. One or more light emitters 108 of a ToF camera may be disposed within the chassis 204 and may be configured to emit light and/or images into the scene 202. The light may include visible light, non-visible light, or both. The images may be visible light images perceptible to the user, visible light images imperceptible to the user, images with non-visible light, or a combination thereof. The light emitter 108 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The light emitter 108 may have a light emitter field of view 206 which describes a particular solid angle. The light emitter field of view 206 may vary according to changes in the configuration of the light emitter 108. For example, the light emitter field of view 206 may narrow upon application of an optical zoom to the light emitter 108. The light emitter field of view 206 may result in emission of light over a small surface area or a larger surface area.

One or more sensors 110 may also be disposed within the chassis 204. The sensors 110 are configured to receive light emitted by the light emitter 108 and reflected off a surface in the scene 202. Thus, the sensors 110 receive reflected light and, further, may comprise respective capacitors that store an amount of energy that is based on an amount of reflected light that each sensor receives. The sensors 110 have a field of view 208 that describes a particular solid angle. The field of view 208 may vary according to changes in the configuration of the sensors 110. For example, an optical lens included with one of the sensors may narrow the field of view 208. The field of view 208 may result in capture of light from a small surface area or a larger surface area, and may align with the light emitter field of view 206.

In some implementations, each sensor may include a photodiode and a storage element. In some embodiments, a light sensor may be equipped a photodiode that is shared by a plurality of storage elements (e.g., capacitors), which each store energy during intervals of time. These storage elements may be used to create data that indicates a distance of an object or surface in the scene 202, as explained in further detail below regarding discussion of time-of-flight of light.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the light emitter(s) 108 and/or the sensors 110. For example, in one implementation the actuator may comprise a pan motor 210, a tilt motor 212, a roll motor 214, and so forth. The pan motor 210 is configured to rotate the chassis 204 in a yawing motion. The tilt motor 212, meanwhile, is configured to change the pitch of the chassis 204. The roll motor 214 is configured to move the chassis 204 in a rolling motion. By panning, tilting, and/or rolling the chassis 204, different views of the scene may be acquired.

One or more microphones 216 may be disposed within the chassis 204, or elsewhere within the scene 202. These microphones 216 may be used to acquire input from the user, may be used to determine the location of a sound, or may be used to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival differences among the microphones and used to summon an active zone within the augmented reality environment.

One or more speakers 218 may also be present to provide for audible output. For example, the speakers 218 may be used to provide output from a text-to-speech module or to playback pre-recorded audio.

A transducer 220 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

In other implementations, the components of the ARFN 102 may be distributed in one or more locations within the environment 100. As mentioned above, microphones 216 and speakers 218 may be distributed throughout the scene. The light emitter 108 and the sensors 110 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
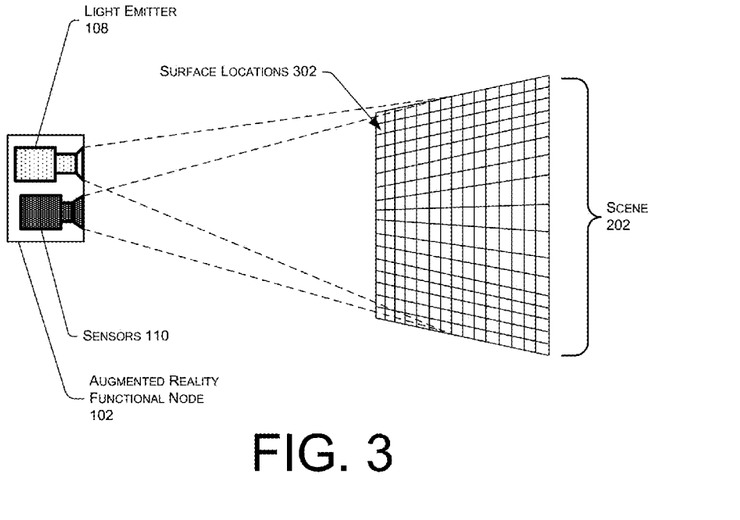
FIG. 3 is an example diagram of the ARFN using a time-of-flight (ToF) camera to identify surfaces, objects, and user interactions within an environment. By identifying user interactions, the ARFN is able to determine when a user is requesting that the ARFN perform a specified action.

FIG. 3 is an example diagram of the ARFN 102 using time-of-flight (TOF) information to determine location and distance information regarding objects, such as users, user hands, and other objects within an environment. However, while the techniques described herein provide one example for obtaining distance information regarding these objects, it is to be appreciated that distance information may be determined in other manners in other embodiments. In addition, the distance information may be used to determine three-dimensional (3D) information about objects.

In the instant illustration, the light emitter 108 emits pulses of light onto the scene 202. The pulses of light may be synchronized with a clock cycle from the clock 130 and include time intervals of "on" and "off", which can be represented by a square wave or other type of wave. The pulses of light may be emitted in wavelengths that are visible to the user, non-visible to the user, or a combination thereof.

The sensors 110 may be used to receive the emitted light after the light is reflected off objects or surfaces in the scene 202. The sensors 110 may measure reflected light at specific surface locations 302 to determine a distance of objects or surfaces in the scene 202. For example, a pair of sensors may be used to measure the distance of a surface of a plurality of surface locations that reflect light. The surface locations 302 may be mapped over a wall, over objects (including people), or over any other surface included in an environment. The sensors 110 may include elements to store measured light for each of the surface locations 302. Thus, the sensors 110 may store a pixilated view of the surface locations, which may later be used to reproduce information about the scene 202.

Figure 4:
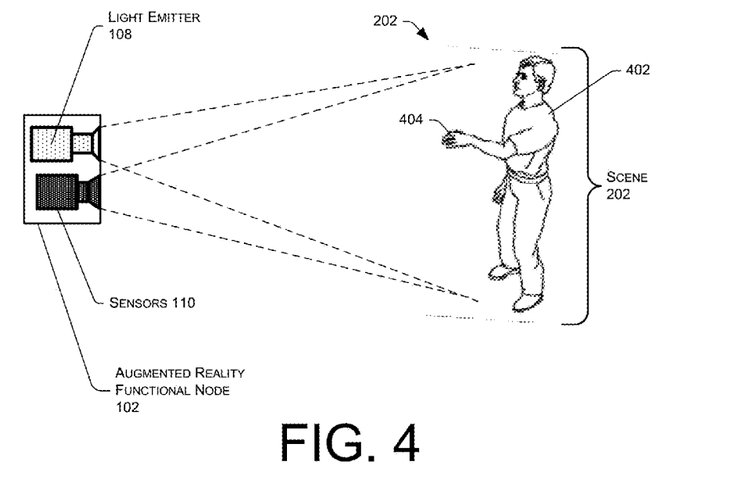
FIG. 4 is an example diagram of the ARFN detecting the pose of a person within an environment.

FIG. 4 is an example diagram of the ARFN 102 detecting the pose of a person within an environment. As discussed above, the sensors 110 detect the light reflected from surfaces within the scene 202. The sensors 110 may provide data that enables identification of a user 402 and/or other objects within the environment. In some instances, this information may be utilized to identify user gestures and trajectories of these gestures, such as a trajectory of a hand 404 of the user 402 or other body part of the user 402. The sensors 110 may also provide data that can be used to identify a location of a selection tool (e.g., a user's finger) as this location changes over time. The ARFN 102 may then use these locations tracked over time to identify a trajectory of the gesture.

FIGS. 5A-5D illustrate techniques to perform TOF calculations by capturing light emitted by a light emitter and reflected off a surface. The captured light is used to determine a distance from the surface.

Figure 5A:
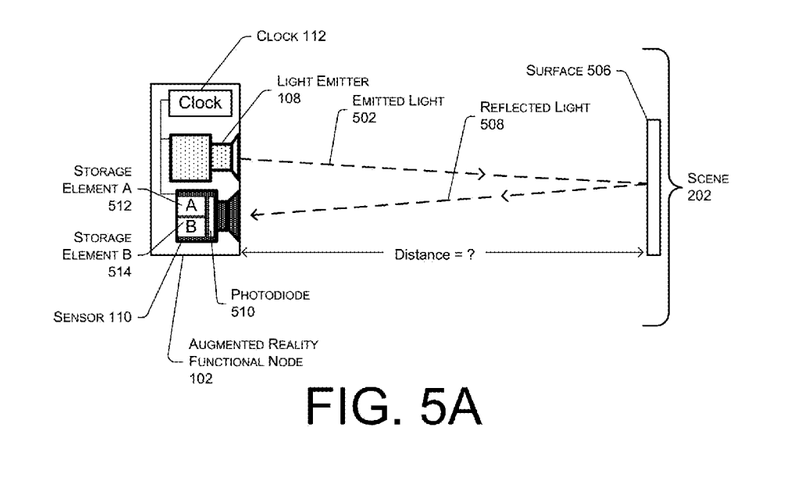
FIGS. 5A-5E illustrate basic techniques to perform TOF calculations by capturing light emitted by a light emitter and reflected off a surface of an object. The captured light is used to determine a distance from the surface.

FIG. 5A shows the light emitter 108 that emits light (emitted light 502) projected in a direction toward the scene 202. The emitted light 502 is generated by pulsing light on and off by the light emitter 108 based on a clock cycle from clock 112. The pulses of light may be represented by a square wave, which is shown and discussed with reference to FIG. 5B. However, other pulses patterns may be employed that do not include equal lengths of time (e.g., emit light for 0.25 μs every 1 μs, etc.) Meanwhile, the emitted light 502 may be reflected off a surface 506, such as off an object, a person, clothing, tools, and so forth. Reflected light 508 may travel back toward the light sensor(s) 108.

In accordance with one or more embodiments, the sensor(s) 108 may include a photodiode 510, a storage element A 512 and a storage element B 514. In these embodiments, the photodiode 510 may be shared by multiple storage elements. However, some configurations may include a separate photodiode for each storage element. For the sake of the following discussion (and through this document), either configuration may be used. The storage elements A and B may store energy from the reflected light 508 captured by the photodiode at different intervals of time. For example, the storage element A 512 may cycle on at a first time and off at a second time while the storage element B 514 may cycle off at the first time and on at the second time in opposite alternation (inverse synchronization) with the storage element A 512. In some embodiments, additional storage element may be used in addition to the storage element A 512 and the storage element B 514, which may store energy from light at different intervals and/or overlapping intervals. The storage elements 512 and 514 may be capacitors or other hardware used to store energy converted from light. At some points, the discussion below may refer to a capture of light from different light sensors, however, it shall be understood that a sensor with a shared photodiode can capture different time intervals of light using multiple storage elements, and thus may perform the function of multiple sensors.

Figure 5B:
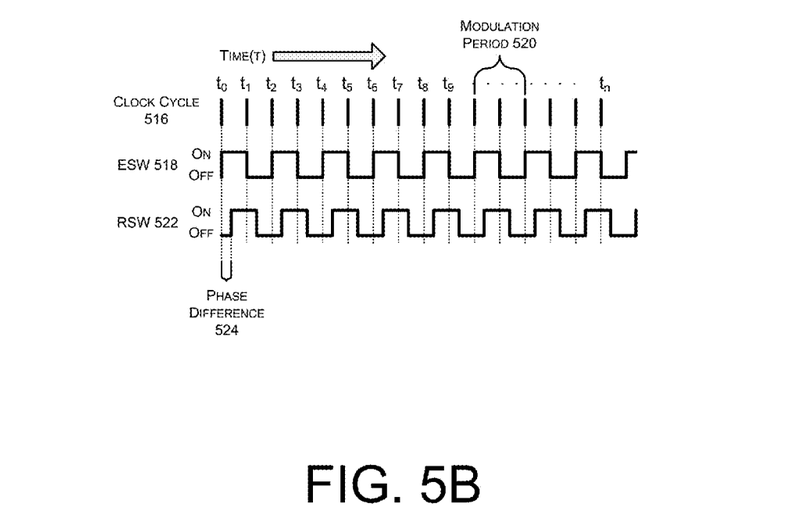

FIG. 5B shows a clock cycle 516 plotted with respect to time (t). The clock cycle 516 may be generated by the clock 110 and include equal segments of time based on a predetermined frequency. In addition, FIG. 5B shows an emitter square wave (ESW) 518 that represents a graph of the pulsing of light by the light emitter 108 between an on-state of operation and an off-state of operation. Although the various waves discussed herein are referred to as square waves, other types of waveforms may be employed to accomplish the same or similar results.

In various embodiments, the on-state and the off-state may be equal in length of time and synchronized to operate during the time intervals provided by the clock cycle 516. For example, the light emitter 108 may emit light for x clock cycles and then be off for x clock cycles until emitting light again for x clock cycles, and so forth. A modulation period 520 is defined by each complete cycle of the light emitter 108 operating the on-state and the off-state once. In the example above, the modulation period 520 is 2x.

FIG. 5B also shows a received square wave (RSW) 522 that represents a graph of the received pulses of the reflected light 508 as captured (stored, measured) by the light sensor 108. The RSW 522 shows when current corresponding to the light is stored (when the sensor is switched to store this current) or not received (when the sensor is not switched to store this current), which is a function of the pulses of light generated by the light emitter 108. Unlike the ESW 518, the RSW 522 may not be synchronized with the clock cycle. A difference in the timing of the transitions of light (e.g., pulses) and the clock cycle is equal to a phase difference 524, which is shown in FIG. 5B, and dependent on a distance of travel of the reflected light 508. The phase difference may be used to determine a distance between the ARFN 102 and the surface 506. The use of the phase difference 524 is explained in further detail with reference to FIGS. 5C and 5D.

Figure 5C:
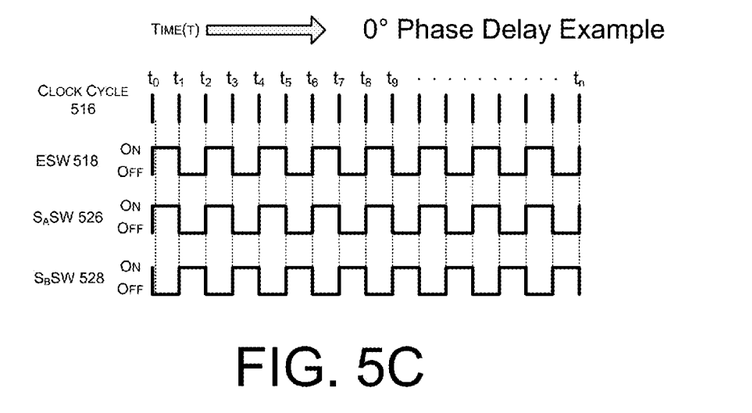

FIG. 5C shows the clock cycle 516, the ESW 518, and graphs depicting functionality of the sensors 110 (i.e., the storage element A 512 and the storage element B 514) plotted with respect to time (t). In accordance with various embodiments, the storage element A 512 and the storage element B 514 may operate in synchronization with the clock cycle 516, and thus in synchronization with the ESW 518. In addition, the storage element A 512 may operate in opposite alternation (inverse synchronization) with the storage element B 514. In this example, because the light emitter begins emitting light pulses at the same time as when the storage element A 512 is ready to receive light, the ToF camera is said to be operating at a 0° phase delay. However, as described above, depending on the distance at which an object is located from the environment, other phase delays may lessen an error associated with a distance measurement and, therefore, the phase delay may be optimized.

In the illustrated example of FIG. 5C, when storage element A 512 is available to store energy from captured light, then storage element B 514 may be unavailable to store energy, and vice versa. A storage element A square wave ($S_A$SW) 526 shows an on-state and an off-state of the storage element A, where the storage element A and B are able to store energy when in the on-state and unable to store energy (e.g., off, blocked, disconnected, etc.) when in the off-state. The $S_A$SW 526 may be synchronized to operate during the time intervals with the light emitter 108 (e.g., synchronized with the ESW 518, but not necessarily the same as the ESW). A storage element B square wave ($S_B$SW) 528 shows an on-state and an off-state of the storage element B, which is inversely synchronized with the $S_A$SW 526. The storage element A and B may be capacitors that receive a charge when light is captured by the photodiode 510 (i.e., the reflected light 508) during the on-state. The capacitors may be discharged after each modulation period or at other intervals In various embodiments, additional storage elements may be employed in addition to the storage element A and B. In some embodiments, the storage element A and B may be implemented as separate sensors each having a photodiode that captures light in multiple time intervals (e.g., interval A and interval B), and so forth.

Figure 5D:
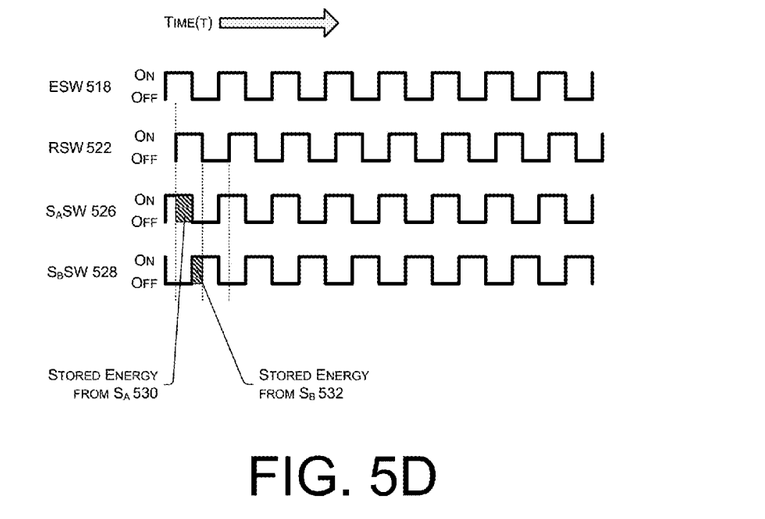

FIG. 5D shows the square waves discussed with reference to FIGS. 5B and 5C during an example plot of time-of-flight of pulses of light. When the $S_A$SW 526 is in the on-state and light is received by the light sensor(s) 110 (shown by the RSW 522), then the storage element A 512 may store energy from captured light such that an amount of light captured by the photodiode 510 can be measured during the on-state of the storage element A (e.g., by charging a capacitor, etc.). The amount of energy stored during this cycle of storage element A is shown as stored energy from storage element A ($SES_A$) 530. When the storage element A is in the off-state, the storage element A no longer stores energy, and thus the $SES_A$ 530 has achieved a maximum value during this modulation period. As discussed above, the storage element B 514 may transition to the on-state when the storage element A transitions to the off-state. When the $S_B$SW 528 is in the on-state and current corresponding to received light is stored by the light sensor(s) 110, then the storage element B 514 may store energy such that an amount of stored energy can be measured during the on-state of the storage element B (e.g., by charging a capacitor, etc.). The amount of energy stored during this cycle of storage element B is stored energy from storage element A ($SES_B$) 532. When the storage element B is in the off-state, the storage element B no longer stores energy, and thus the $SES_B$ 532 has achieved a maximum value during this modulation period.

Since light travels at a known velocity, a ratio of the $SES_A$ 530 and $SES_B$ 532 provides a linear plot, and thus allows calculation of a distance between the surface 506 and the ARFN 102 (or other known position) when the distance is within a predetermined range. The predetermined range is equivalent to the amount of time of the pulse of light (i.e., the on-state) from the light emitter 108 multiplied by the speed of light (approximately 300,000 km/s). For example, when the pulse is 0.5 µs, then the predetermined range is 150 meters. Thus, the ratio of the $SES_A$ 530 and $SES_B$ 532 enables determination of distances within a known 150 meter range in this example.

Figure 5E:
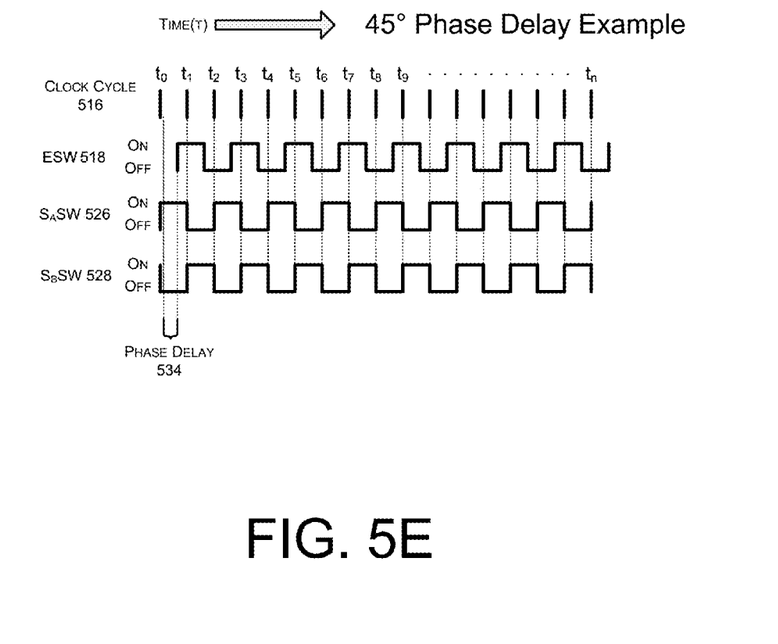

As described above, however, the ToF camera may be configured to operate at different phase delays—or the amount of delay time between the first sensors being available to receive light and when a first pulse of the light pulses is emitted. FIG. 5E illustrates an example where the ToF camera is implements a 45° phase delay. Of course, while FIG. 5 collectively illustrates two different phase delays, multiple other phase delays may be implemented.

Figure 6:
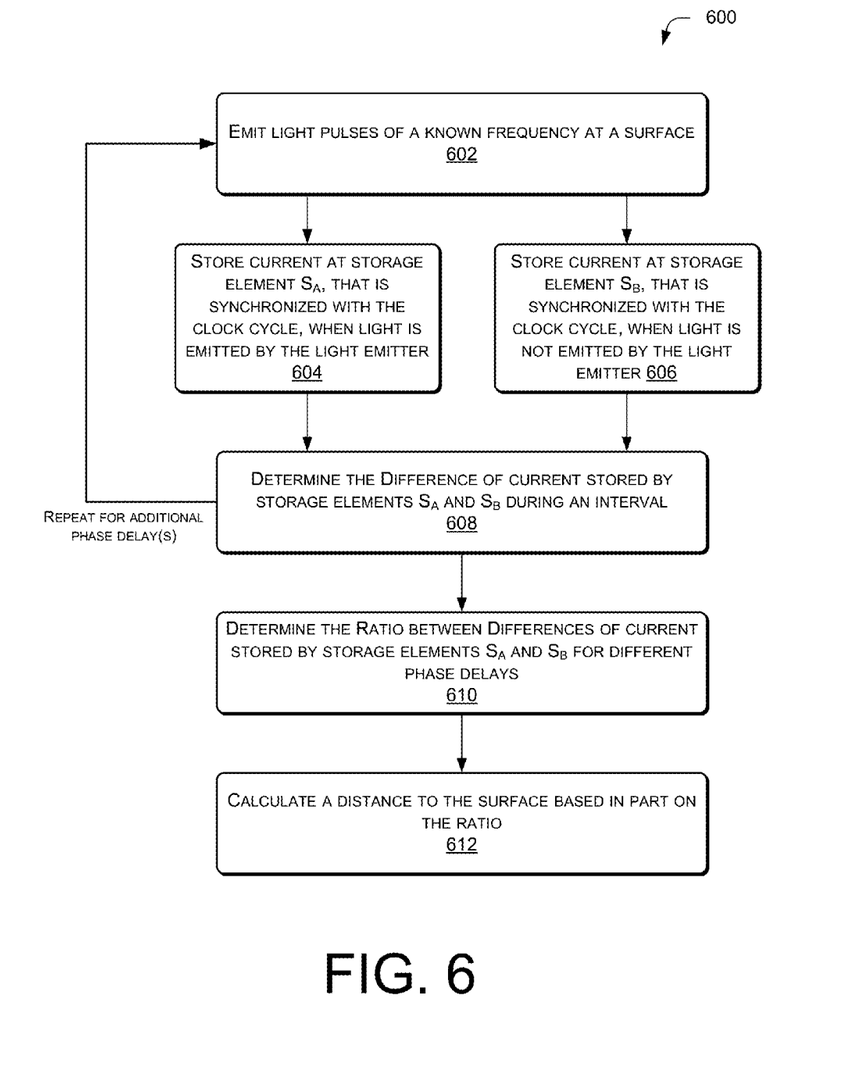
FIG. 6 illustrates a flow diagram of an example process to calculate a distance using a ratio of light captured by various sensors or storage elements of a ToF camera.

FIG. 6 illustrates an example flow diagram 600 of a process to calculate a distance using the ratio of current corresponding to light captured by various sensors or storage elements.

At 602, light pulses of a known frequency are emitted at a surface. The frequency may be sent relative to a clock cycle (at a particular phase delay) and may have equal lengths of time of emission of light and no emission of light (e.g., on/off). The light pulses may be represented by a square wave as shown in FIGS. 5B-5E; however, other waveforms may be used. The selection of the frequency determines the predetermined range of distances that can be determined using the ratio as discussed here. The selection of the frequency may also determine an accuracy of the measurements, and thus accuracy of the distance calculations. Distances outside of this range may have a same ratio when using two storage elements (e.g., $S_A$, $S_B$), and thus provide a duplication or aliasing effect.

At 604, reflected light is captured by the photodiode 510, converted into current, and stored by the storage element A 512 when the storage element A is in the on-state and is able to store energy (e.g., when a switch is configured to direct the current to the storage element A 512 and not to the storage element B 514). The storage element A 512 may be synchronized with the clock cycle, and thus may store a charge when the light emitter emits light in the on-state.

At 606, reflected light is captured by the photodiode 510, converted into current, and stored by the storage element B 514 when the storage element B is in the on-state and is able to store energy (e.g., when a switch is configured to direct the current to the storage element B 514 and not to the storage element A 512). The storage element B 514 may operate in an opposite alternation with the storage element A, thus storage element B 514 may be operating in the on-state when the storage element A 512 is operating in the off-state. Therefore, the storage element B 514 may be inversely synchronized with the storage element A 512.

At 608, for a calculation of the difference between the amount of energy stored by the storage element A 512 ($SES_A$ 530) and the amount of energy stored by the storage element B 514 ($SES_B$ 532) during a modulation period or other interval of time. As illustrated, the operations 602-608 then repeat for one or more additional phase delays. For instance, these operations may occur for phase delays of 0°, 90°, 180°, and 270°.

At 610, the ratio between the differences calculated at 608 may then be determined. For instance, a ratio may be calculated between the differences calculated at the 0° and 180° and the differences calculated at the 90° and 270° phase delays. In another example, the relative phase of the return light is calculated using arctangent of the difference of the "AB signals" at 0° and 180° relative phase delay and of the difference of the AB signals at 90° and 270° is calculated.

At 612, a distance between the surface that reflects the light and the ARFN 102 is calculated based in part on the calculated ratio (or r, the arctangent of the AB difference values calculated at 608 in some instances), the predetermined frequency of the pulses of light, and the speed of light. As discussed above, the distance may need to be within a predetermined range to avoid a duplication or aliasing effect. Operation 612 may also include generating calibration data for range offsets and non-linearity of the phase to distance mapping.

Figure 7:
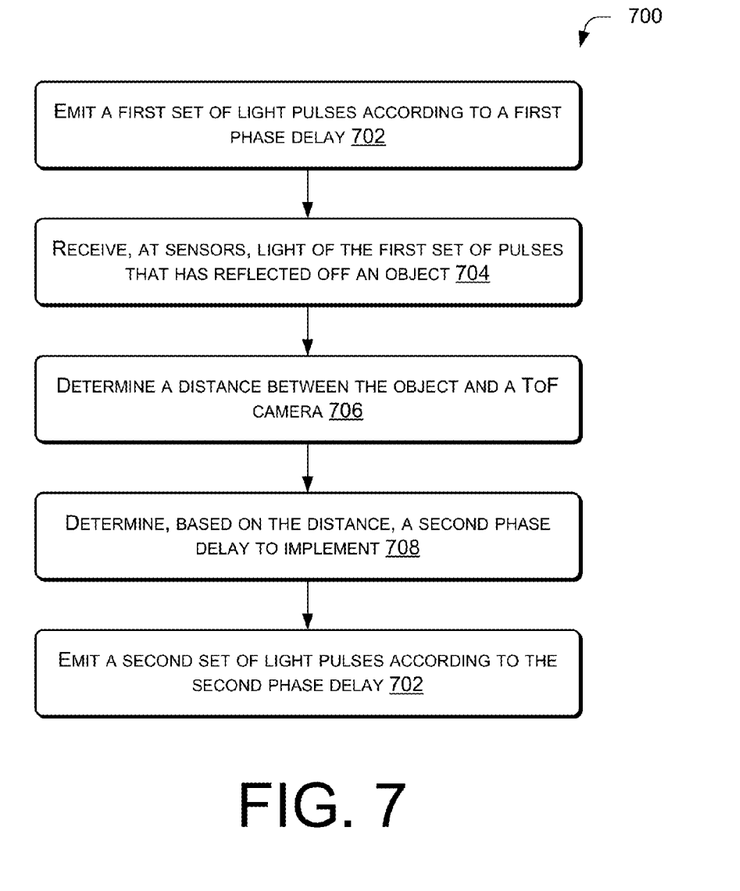
FIG. 7 illustrates a flow diagram of an example process to determine a distance between an object in an environment and a ToF camera, and to adjust a phase delay of the ToF camera based at least in part on the distance.

FIG. 7 illustrates a flow diagram of an example process to determine a distance between an object in an environment and a ToF camera, and to adjust a phase delay of the ToF camera based at least in part on the distance.

At 702, a ToF camera emits a first set of light pulses from a light emitter of the ToF camera within an environment, the ToF camera implementing a first phase delay between the light emitter and a controller alternating between use of sensors of the ToF camera. At 704, the ToF camera receives, at the sensors, light of the first set of light pulses that has reflected off an object in the environment. At 706, the ToF camera determines a distance between the ToF camera and the object based at least in part on the received light. At 708, the ToF camera determines, based at least in part on the distance, a second phase delay to implement, the second phase delay different from the first phase delay. For instance, the ToF camera may reference a mapping of predefined distances to phase delays or may calculate the phase delay using a predefined function and the determined distance as a variable for solving for the second phase delay. In either case, at 710, the ToF camera emits a second set of light pulses from the light emitter according to the second phase delay.

Although the subject matter has been described in language specific to structural features, it is to be understood that the subject matter defined in the appended claims is not necessarily limited to the specific features described. Rather, the specific features are disclosed as example forms of implementing the claims.

What is claimed is:

1. A time-of-flight (ToF) camera, comprising:
a light emitter configured to emit light in pulses within an environment;
a photodiode to receive light that has been emitted from the light emitter and has reflected off of an object in the environment, and convert the received light into an electrical current;
a first storage element configured to receive a first amount of the electrical current and to store an amount of charge corresponding to the first amount of the electrical current;
a second storage element configured to receive a second amount of the electrical current and to store an amount of charge corresponding to the second amount of the electrical current;
a controller configured to alternate between directing the electrical current to the first storage element and directing the electrical current to the second storage element; and
one or more processors configured to:
calculate a first distance between a portion of the ToF camera and the object based at least in part on a first amount of charge stored in the first storage element and a second amount of charge stored in the second storage element;
determine a phase delay based at least in part on the first distance, the phase delay corresponding to a delay between emitting of light by the light emitter and at least one of directing the electrical current to the first storage element or directing the electrical current to the second storage element by the controller;
configure the light emitter to emit light in pulses according to the phase delay; and
calculate a second distance between the portion of the ToF camera and the object based at least in part on a third amount of charge stored in the first storage element and a fourth amount of charge stored in the second storage element.

2. The ToF camera of claim 1, further comprising memory, the memory storing a mapping between respective estimated distances and respective phase delays to implement, and wherein the one or more processors are configured to determine the phase delay with reference to the mapping.

3. The ToF camera of claim 1, further comprising a memory, the memory storing a function for use in calculating a phase delay to implement based on a calculated distance, and wherein the one or more processors are configured to determine the phase delay with use of the function.

4. The ToF camera of claim 1, further comprising a clock, and wherein the controller references the clock for determining when to alternate between directing the electrical current to the first storage element and directing the electrical current to the second storage element.

5. The ToF camera of claim 1, further comprising a clock, and wherein the controller references the clock for implementing the phase delay.

6. A method implemented at least in part by a time-of-flight (ToF) camera, the method comprising:
 emitting a first set of light pulses from a light emitter of the ToF camera within an environment, the ToF camera implementing a first phase delay between the light emitter and a controller directing current between a first storage element and a second storage element of the ToF camera;
 receiving light of the first set of light pulses that has reflected off an object in the environment;
 converting the light into current;
 alternating between directing the current to the first storage element and directing the current to the second storage element;
 determining a distance between a portion of the ToF camera and the object based at least in part on an amount of charge stored in the first storage element and an amount of charge stored in the second storage element;
 determining, based at least in part on the distance, a second phase delay to implement, the second phase delay different from the first phase delay; and
 emitting a second set of light pulses from the light emitter according to the second phase delay.

7. A method as recited in claim 6, wherein the first phase delay comprises an amount of time between: (i) the first storage element beginning to receive a portion of the current, and (ii) emission of a first light pulse of the first set of light pulses from the light emitter.

8. A method as recited in claim 6, wherein the current comprises first current and the distance comprises a first distance, and further comprising:
 receiving light of the second set of light pulses that has reflected off an object in the environment;
 converting the received light of the second set of light pulses into second current;
 alternating between directing the second current to the first storage element and directing the second current to the second storage element;
 determining a second distance between the portion of the ToF camera and the object based at least in part on an amount of charge stored in the first storage element from the second current and an amount of charge stored in the second storage element from the second current.

9. A method as recited in claim 8, further comprising:
 determining, based at least in part on the second distance, a third phase delay to implement, the third phase delay different from the second phase delay; and
 emitting a third set of light pulses from the light emitter according to the third phase delay.

10. A method as recited in claim 6, further comprising:
 creating a depth map of the environment at least in part using data gathered by the ToF camera;
 identifying the object from the depth map; and
 tracking the object at least partly in response to the identifying.

11. A method as recited in claim 6, wherein the determining of the second phase delay comprises referencing a predetermined mapping of distances to corresponding phase delays.

12. A method as recited in claim 6, wherein the determining of the second phase delay comprises using the distance as a variable in a predefined function for calculating the second phase delay.

13. An apparatus, comprising:
 a light emitter configured to emit light in pulses within an environment;
 a photodetector to receive reflected light of the emitted light and convert the reflected light into current;
 a first storage element configured to: (i) receive a first amount of the current, and (ii) store a first amount of charge;
 a second storage element configured to: (i) receive a second amount of the current, and (ii) store a second amount of charge;
 a controller for alternating between directing the current to the first storage element and directing the current between the second storage element; and
 one or more processors configured to: (i) determine a distance between at least a portion of the apparatus and the object based at least in part on the first amount of charge and the second amount of charge, and (ii) determine, based at least in part on the distance, a phase delay between the light emitter emitting the light in pulses relative to at least one of the directing of the current to the first storage element or the directing of the current to the second storage element by the controller.

14. The apparatus of claim 13, wherein the one or more processors are configured to periodically or continuously determine a distance between the portion of apparatus and the object and periodically or continuously determine the phase delay.

15. The apparatus of claim 13, further comprising a clock, and wherein controller is further configured to implement the phase delay by referencing the clock and instructing the light emitter to emit light pulses based at least in part on the referencing.

16. One or more computer-readable media storing computer-executable instructions that, when executed, cause one or more processors to perform acts comprising:
 instructing a light emitter of a time-of-flight (ToF) camera to emit light pulses in an environment, the ToF camera implementing a first phase delay;
 determining a distance between a portion of the ToF camera and an object in the environment based at least in part on light of the light pulses reflected off of the object; and
 determining, based at least in part on the distance, a second phase delay of the ToF camera.

17. One or more computer-readable media as recited in claim 16, wherein the distance comprises a first distance, and the acts further comprising:
- instructing the light emitter of the ToF camera to emit light pulses in the environment, the ToF camera implementing the second phase delay; and
- determining a second the distance between the portion of the ToF camera and the object.

18. One or more computer-readable media as recited in claim 16, the acts further comprising:
- determining, based at least in part on the distance, not to adjust the first phase delay to the second phase delay;
- instructing the light emitter of the ToF camera to emit light pulses in the environment, the ToF camera implementing the first phase delay; and
- determining the another distance between the portion of the ToF camera and the object.

19. One or more computer-readable media as recited in claim 16, the acts further comprising:
- comparing the distance to one or more distances in a mapping of the one or more distances to corresponding phase delays; and
- selecting an amount to adjust the first phase delay to the second phase delay based at least in part on the comparing.

20. One or more computer-readable media as recited in claim 16, the acts further comprising:
- identifying the object as an object of interest within the environment; and
- tracking the object as least partly in response to the identifying.

* * * * *